United States Patent [19]

Mani et al.

[11] 4,391,680

[45] Jul. 5, 1983

[54] PREPARING ALKALI METAL HYDROXIDE BY WATER SPLITTING AND HYDROLYSIS

[75] Inventors: Krishnamurthy Mani, Denville; Frederick P. Chlanda, Rockaway, both of N.J.

[73] Assignee: Allied Corporation, Morris Township, Morris County, N.J.

[21] Appl. No.: 327,145

[22] Filed: Dec. 3, 1981

[51] Int. Cl.³ ............................ C25B 1/16; C25B 1/22
[52] U.S. Cl. ...................................... 204/98; 204/103; 204/128; 204/129; 204/180 P; 204/296
[58] Field of Search ............... 204/180 P, 98, 128, 204/129, 103, 296

[56] References Cited

U.S. PATENT DOCUMENTS

| | | | |
|---|---|---|---|
| 3,654,125 | 4/1972 | Leitz | 204/180 P |
| 3,844,927 | 10/1974 | Smith | 204/180 P |
| 3,905,886 | 9/1975 | Wang | 204/180 P |
| 4,024,043 | 5/1977 | Dege et al. | 204/180 P |
| 4,219,396 | 8/1980 | Gancy et al. | 204/180 P |

Primary Examiner—R. L. Andrews
Attorney, Agent, or Firm—Alan M. Doernberg; Gerhard H. Fuchs; Thomas D. Hoffman

[57] ABSTRACT

A two-compartment water splitter having alternating cation and bipolar membranes is used to remove alkali metal cations from an aqueous alkali metal chloride solution so as to produce an acidified salt solution. The coproduct is a base such as NaOH or KOH. The acidified salt solution may then be fed to a membrane or diaphragm electrolytic cell for production of chlorine and alkali metal hydroxide.

16 Claims, 5 Drawing Figures

PREPARING ALKALI METAL HYDROXIDE BY WATER SPLITTING AND HYDROLYSIS

DESCRIPTION

BACKGROUND OF THE INVENTION

The present invention relates to the production of sodium and potassium hydroxide and chlorine from sodium or potassium chloride, and especially to processes employing diaphragm or membrane cells for an electrolytic process therefore.

In the electrolytic production of alkali metal hydroxides (sodium hydroxide and potassium hydroxide, especially, are produced by electrolytic techniques), the net reaction is $$2MCl + 2H_2O \rightarrow 2MOH + Cl_2 + H_2$$

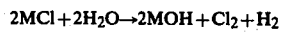

with chlorine and hydrogen gases, respectively removed from the anode and cathode compartments as gases. Mercury cell processes for this reaction are being supplanted by diaphragm and membrane processes, with two electrolytic chambers separated by, respectively, a diaphragm or membrane. In both membrane and diaphragm processes, aqueous salt solution is fed into the anode chamber and the product MOH is removed from the cathode chamber. The processes differ in that the diaphragm (e.g. asbestos) permits MCl to migrate into the cathode and thus become mixed with the product MOH, while the membrane (e.g. perfluorosulfonic acid resin) permits only sodium or potassium cations (and hydrogen ions) to migrate to the cathode chamber, causing the depleted brine to be removed separately from the anode chamber.

Hydroxide formed in the cathode chamber of both diaphragm and membrane processes has a tendency to migrate, at least in part, back through the diaphragm or membrane, to the anode. If unneutralized, hydroxide will cause a series of reactions leading to hypochlorite, chlorate and/or oxygen. These reactions are generally avoided by adding HCl to the brine feed to the cathode, thereby maintaining a pH in the cathode of between about 0.5 and 6. Such acid may be formed by reacting product hydrogen with product chlorine, or as by-product of various processes employing chlorine. Both sources of HCl have disadvantages for many plants. For instance, the local need for hydrogen and chlorine may be sufficient to consume all of these gases that are produced. By-product HCl often has impurities or has its own local demand (e.g. for iron pickling or oxychlorination or hydrochlorination). In other plants, the by-product HCl is not generated locally, and must be purchased and transported back to the electrolytic plant.

Devices having stacked pairs of membranes have been suggested for various applications such as desalinization (U.S. Pat. No. 3,654,125 to Leitz) and springing of sulfur dioxide from aqueous sulfite and bisulfite solutions (U.S. Pat. No. 4,082,835 to Chlanda et al.), but such devices have no readily apparent application to the production of alkali metal hydroxides and chlorine.

One disadvantage of electrolytic cells for production of sodium hydroxide or potassium hydroxide is that the demand for these products, especially local demand, may exceed that for the chlorine by-product. If, for example, potassium hydroxide is produced in connection with fertilizer manufacture, the handling, packaging and shipment of by-product chlorine may, on the scale produced, by relatively uneconomical. Thus, a need exists in certain localities for processes producing alkali metal hydroxides more efficiently alone, without the production of chlorine.

BRIEF DESCRIPTION OF THE PRESENT INVENTION

It has been found that an acidified brine for electrolytic cells may be generated from aqueous brine without the addition of HCl from an external source by use of two-compartment water splitting techniques utilizing a cation membrane and a bipolar membrane. The by-product is aqueous alkali metal hydroxide (e.g. NaOH or KOH) which may have a concentration substantially greater than concentration of HCl in the acidified brine. Extremely high efficiencies can be obtained based on the current used, while achieving HCl levels in the salt solution (about 0.1 to about 2 weight % HCl or 0.6–13 moles HCl per one hundred moles chloride salt) satisfactory for either diaphragm or membrane electrolytic processes for the production of additional alkali metal hydroxide and chlorine (as well as hydrogen). Thus the present invention includes a process which comprises the steps:

(a) introducing aqueous alkali metal chloride solution into a two-compartment water splitter comprised of alternating cation and bipolar membranes into each first compartment between a cation membrane and a cation side of a bipolar membrane, (b) introducing into each second compartment between a cation membrane and an anion side of a bipolar membrane a liquid comprising water, (c) passing a direct current through said water splitter thereby causing acidification of said aqueous alkali metal chloride solution and basification of said liquid comprising water and transfer of alkali metal cations from said aqueous salt solution to said liquid comprising water, (d) withdrawing from said second compartments a liquid comprising aqueous alkali metal hydroxide, (e) withdrawing from said first compartments an acidified aqueous salt solution comprising between about 0.6 and 13 moles HCl per one hundred moles alkali metal chloride, and (f) feeding said acidified salt solution to the anode compartment of a diaphragm or membrane electrolytic cell.

DETAILED DESCRIPTION OF THE INVENTION

The two-compartment water splitter used in steps a-e of the process of the present invention may be any of the devices described in U.S. Pat. No. 4,082,835 to Chlanda et al. (1979) for electrodialytic water splitting of sodium bisulfite and similar salts.

The two-compartment water splitter incorporates a plurality of cation and bipolar ion exchange membranes arranged in an alternating fashion between two electrodes thus forming an electrodialysis stack. The construction of electrodialysis stacks is well known and, for example, units are available commercially from Asahi Glass Co., 1-2, Marunochi 2-chome, Chiyoda-ku, Tokyo, Japan; Ionics, Inc., Watertown, Massachusetts and other commercial sources. In general, stacks which are suitable for electrolyte concentration such as the Ashai Model CU-IV, may be used for the water splitter. However, the membrane used therein must be of a kind adaptable to water splitting. The two compartment water splitter or its equivalent converts water into hydrogen and hydroxyl ion. The water splitter employs suitable bipolar membranes, that can be of the type described, for example, in U.S. Pat. No. 2,829,095 to ODA et al., which has reference to water splitting generally, or any other type which effectively converts water into hydrogen and hydroxyl ions.

The operation of the water splitter is further described below by reference to FIG. 1.

The aqueous alkali metal chloride solution fed into the first compartments is preferably sodium chloride or potassium chloride, but may also be lithium chloride or even, conceivably, other alkali metal chlorides, or mixtures thereof. Generally, it will have a pH between about 6 and about 13, with basic solutions (e.g. pH 8–12) being usually those coming from a purification step in which base (e.g. carbonate or hydroxide) has been added to impure, naturally occuring salt solution to precipitate polyvalent metals such as calcium, aluminum, magnesium and the like. The pH of the solution fed to the first compartment is not critical.

The concentration of alkali metal chloride in the feed solution may be as low as about 2 weight percent alkali metal chloride, especially if the product acidified aqueous salt solution is not to be fed to an electrolyte cell, and may be as high as the solubility of the alkali metal chloride in water. Preferably, the feed solution is between about 5 weight percent (more preferable about 10 weight percent) and the saturation concentration of alkali metal chloride. Most preferably, especially when the acidified salt solution is to be fed to an electrolytic cell, the feed solution is saturated in alkali metal chloride.

Preferably, the feed solution is substantially free of other cations (e.g. $Ca++$, $Mg++$, $Fe++$ or $Fe+++$) that either will migrate across the cation membrane and precipitate in the by-product alkali metal hydroxide solution or will precipitate and foul the cation membrane. Preferably, if the acidified brine is to be fed to an electrolytic cell, the feed solution is also substantially free of anions other than chloride such as bromide or sulfate, which may complicate the later operation of the electrolytic cell.

The liquid fed to the second compartments may be water alone, or may be water with any of a variety of electrolytes in it. Preferably, this liquid is neutral or basic (pH 7–14) and more preferably it is aqueous sodium hydroxide of a concentration between about 1 and about 50 weight percent (more preferably between about 5 and about 25 weight percent). This concentration (the actual feed to the second compartments) may be achieved by recycle, staging or a combination thereof as described in more detail below. The liquid added to the system overall may be even more dilute sodium hydroxide or pure water, or may be the aqueous sodium hydroxide fed directly to the second compartments.

The current passed through the water splitter in conventional fashion is direct current of a voltage dictated by design and performance characteristics readily apparent to the skilled artisan and/or determined by routine experimentation. Current densities between about 50 and about 250 amps per square foot (between about 55 and about 270 milliamps per square centimeter) are preferred; and current densities between about 80 and about 150 amps per square foot (between about 85 and about 165 milliamps per square centimeter) are more preferred. Higher or lower current densities are contemplated, however, for certain specific applications.

The result of the current flow is electrodialysis to produce an acidified salt solution in the first compartments and a liquid comprising alkali metal hydroxide (of concentration greater than any in the feed liquid) in the second compartments. It is contemplated that the flow rate out of the different compartments may be the same or different, and especially that the flow rates (or net flow rates after recycle) out of the second compartments may be considerably slower than out of the first compartments such that the hydroxide concentration in the product aqueous alkali metal hydroxide solution is substantially greater than the acid concentration in the product acidified alkali metal chloride solution.

Representative acid concentrations in the acidified alkali metal chloride are between about 0.6 and about 13 moles HCl per 100 moles alkali metal chloride, preferably between about 1 and 10 mole HCl per 100 moles alkali metal chloride. If one starts with 25 weight percent sodium chloride, these ranges translate into products of about 0.1–2% HCl, preferably about 0.17–1.5% HCl, by weight. More preferred HCl concentrations depend upon the application. If the acidified brine is to be fed to a membrane cell, there is preferably 0.7–1.5% HCl. If the acidified brine is to be fed to a diaphragm cell, there is preferably 0.17–0.7% HCl. Of course, one may produce brine of higher HCl concentration and then mix the acidified brine with additional alkali metal chloride solution either in or upstream of the anode compartments of the electrolytic cells. If the only product to be used is the base produced in the second compartments, then a broad range of HCl concentrations may be achieved, with lower HCl concentrations improving efficiency, but higher HCl concentrations lowering the amount of salt solution required to produce a given amount of base.

The concentration of base withdrawn from the second compartments is greater than that fed, but is preferably between about 5 and about 40 weight %.

DESCRIPTION OF THE EMBODIMENTS

Figure 1:
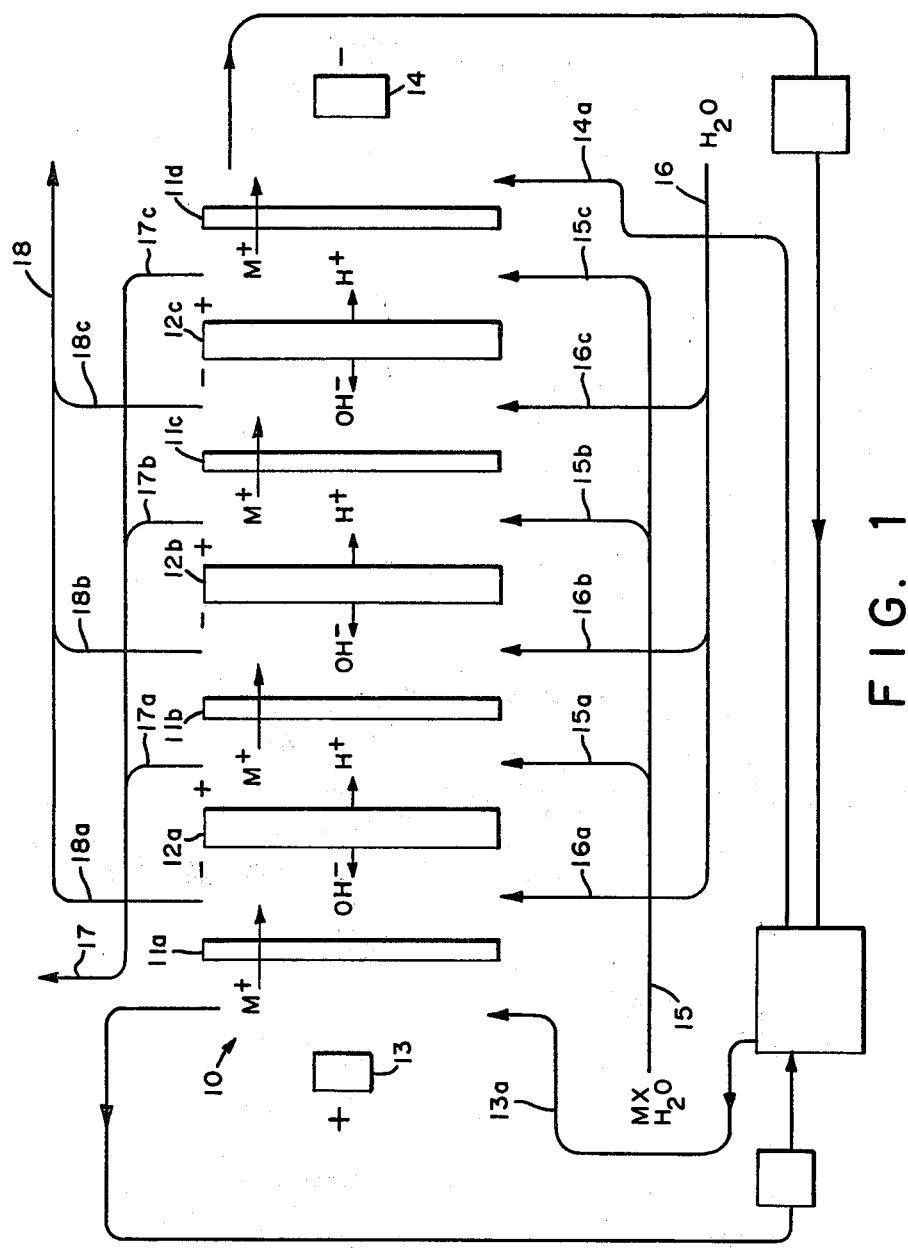
FIG. 1 shows an electrodialysis stack of the invention.

FIG. 1 illustrates a form of the process of the present invention. An electrodialysis stack 10 is shown with alternating cation membranes 11 and bipolar membranes 12 placed between an anode 13 and cathode 14. The cation membranes are first cation membrane 11a, second cation membrane 11b, third cation membrane 11c, and fourth cation membrane 11d. The bipolar membranes are first bipolar membrane 12a, second bipolar membrane 12b and third bipolar membrane 12c, each oriented with the cation permeable face towards the cathode 14. The electrodialysis stack may contain a greater number of membrane pairs (frequently one hundred or more), but must contain at least two cation membranes and at least one bipolar membrane. An aqueous alkali metal chloride solution such as saturated sodium chloride is fed in stream 15 to the electrodialysis stack 10. A first portion 15a of aqueous salt stream 15 is fed between the cation permeable (positive) side of bipolar membrane 12a and the second cation membrane 11b. Similarly, aqueous alkali metal salt streams 15b and 15c are fed between the positive sides of bipolar membranes 12b and 12c and cation membranes 11c and 11d respectively. Simultaneously, a water stream 16, which may contain minor amounts of various electrolytes, and especially low concentrations of alkali metal hydroxide, is fed to electrodialysis stack 10 through stream 16a between cation membrane 11a and the anion permeable (negative) side of bipolar membrane 12a, in stream 16b to between cation membrane 11b and the negative side bipolar membrane 12b and in stream 16c to between cation membrane 11c and the negative side of bipolar membrane 12c. A salt solution such as aqueous sodium sulfate in fed to the compartments adjacent the anode and cathode in streams 13a and 14a from a reservoir, and returned from these compartments to the reservoir after degassing to remove hydrogen and oxygen. Current is passed between anode 13 and cathode 14 through the electrodialysis stack 10, causing alkali metal cations to migrate toward the cathode across the cation membranes 11a, 11b, 11c and 11d. At bipolar membranes 12a, 12b and 12c, water is split such that protons migrate into the compartments from which the alkali metal cations have migrated, while hydroxide anions migrate from the minus side of the bipolar membranes into the same compartments as the alkali metal cations have migrate into. Accordingly, alkali metal hydroxide is formed in each of the compartments between a cation membrane and the minus side of a bipolar membrane, and this alkali metal hydroxide is withdrawn from the electrodialysis stack 10 through streams 18a, 18b and 18c and collected in stream 18 as aqueous alkali metal hydroxide. If stream 16 contains electrolytes, they will normally still be present in stream 18; in particular, if stream 16 contains a low concentration of alkali metal hydroxide, stream 18 will contain a higher concentration of alkali metal hydroxide.

The compartments between the positive side of each bipolar membrane and the adjacent cation membrane will still contain alkali metal chloride at high concentration, but will be somewhat depleted in alkali metal and enriched in protons, such that the alkali metal chloride will now be acidified. This acidified alkali metal chloride is withdrawn from these compartments in streams 17a, 17b, and 17c. The acidified alkali metal chloride streams are combined as a second product in stream 17.

Figure 2:
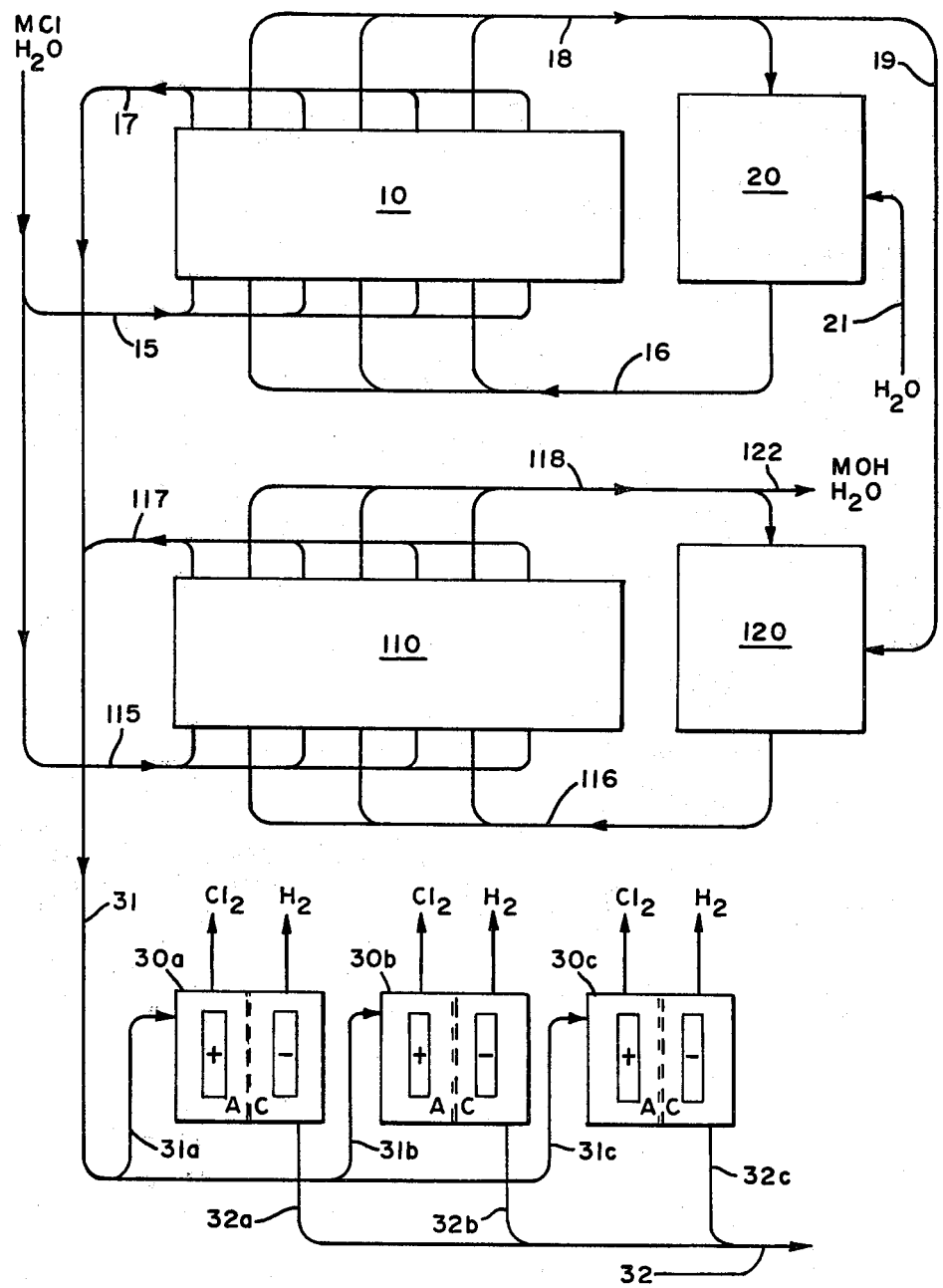
FIG. 2 shows electrodialysis stacks together with conventional electrolytic diaphragm cells.

FIG. 2 illustrates the use of the present process in conjunction with a conventional electrolytic diaphragm process for the production of alkali metal hydroxide, chlorine and hydrogen. A stream of alkali metal chloride of high concentration, such as saturated sodium chloride, is fed in streams 15 and 115 to electrodialysis stacks 10 and 110, each of which operates in a manner similar to that of electrodialysis stack 10 in FIG. 1. Dilute base is fed in stream 16 to the compartments of electrodialysis stack 10 between the negative side of each bipolar membrane and the adjacent cation membrane, such as shown for streams 16a, 16b and 16c in FIG. 1. Through the passage of current across electrodialysis stack 10, the aqueous alkali metal chloride in stream 15 is caused to be depleted of alkali metal cations, which are replaced with protons, such that an acidified aqueous brine solution is formed and withdrawn from these compartments and combined into stream 17. The flow rates into the dialysis stacks 10 and 110 through streams 15 and 115, and out of the dialysis stacks 10 and 110 through streams 17 and 117, are such that streams 17 and 117 will contain approximately 5–10 moles HCl per 100 moles alkali metal chloride. In the other compartments of stack 10, alkali metal cations from the salt solution are introduced into the aqueous base in stream 16, while hydroxide from the water splitting is also introduced. Accordingly, the material removed from these compartments in stream 18, much as the material removed in stream 18a, 18b and 18c of FIG. 1, contains a higher concentration of alkali metal hydroxide. A portion of stream 18 is fed to a reservoir 10 of dilute aqueous base, which is replenished by a small stream of water through stream 21. The remainder of base stream 18 is fed in stream 19 to a second base reservoir 120, which will contain a higher concentration of alkali metal hydroxide. From stream 120 base of the higher concentration is withdrawn in stream 116 and fed to the compartments of electrodialysis stack 110 between the minus side of each bipolar membrane and the adjacent cation membrane, in the same manner as streams 16a, 16b and 16c in FIG. 1. The operation of electrodialysis stack causes more alkali metal and more hydroxide to be introduced into this base, such that a base of still higher concentration is withdrawn from the electrodialysis stack 110 from these compartments and combined in stream 118. A portion of stream 118 is taken as product stream 122 of the desired high concentration of alkali metal hydroxide. The remainder of stream 118 is recycled to vessel 120 so as to mix with the more dilute aqueous alkali metal hydroxide from stream 19 and maintain a consistent concentration in vessel 120 for feeding through stream 116 to electrodialysis stack 110.

The acidified aqueous alkali metal chloride solutions in streams 17 and 117 are combined in feed stream 31 to a series of conventional diaphragm electrolytic cells, illustrated by cells 30a, 30b, and 30c in FIG. 2. A portion of stream 31 is feed in stream 31a to the anode compartment of diaphragm cell 30a where chlorine is generated. The solution passes through the diaphragm into the cathode where hydrogen is generated, leaving a mixture of alkali metal hydroxide and alkali metal chloride which is withdrawn from cell 30a in stream 32a. Because of the inefficiency of the diaphragm, however, some hydroxide formed in the cathode compartment will tend to leak back into the anode compartment, and would cause undesired by-products such as hypochlorite to be generated along with the chlorine. Because, however, the aqueous alkali metal chloride fed in stream 31a is acidified, any such hydroxide that migrates back through the diaphragm will be neutralized before reaching the anode. In similar fashion, acidified alkali metal chloride streams 31b and 31c are fed to diaphragm cells 30b and 30c, where chlorine is generated at the anode and hydrogen is generated at the cathode, with mixtures of alkali metal chloride and alkali metal hydroxide withdrawn from the cathode compartments in streams 32b and 32c. Streams 32a, 32b and 32c are combined into the stream 32, from which product alkali metal hydroxide and byproduct depleted alkali metal chloride are separated in a conventional fashion.

Figure 3:
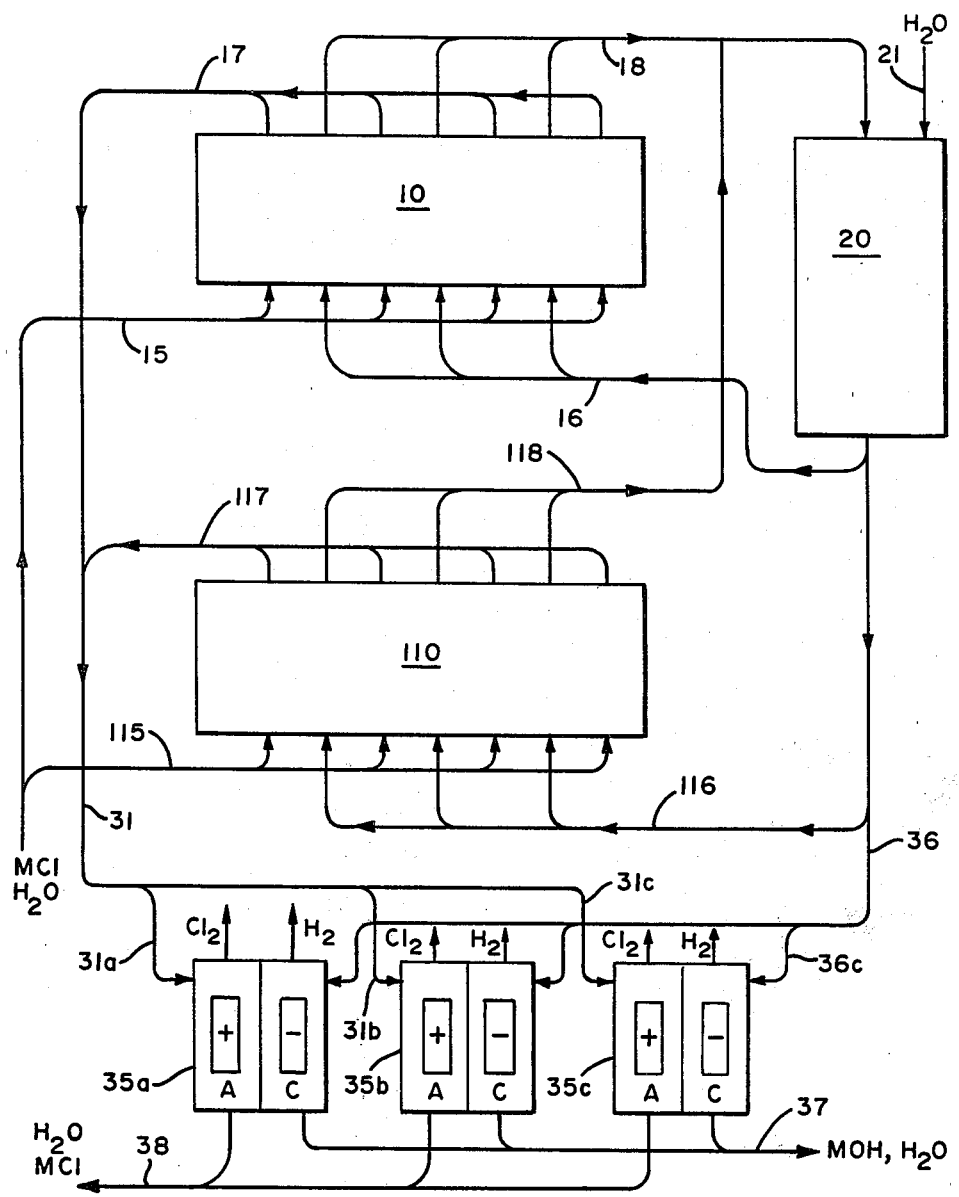
FIG. 3 shows electrodialysis stacks together with conventional electrolytic membrane cells.

FIG. 3 illustrates the practice of the present electrodialysis process in conjunction with a conventional electrolytic membrane cell. A source of aqueous alkali metal chloride such as saturated sodium chloride is fed in streams 15 and 115 to electrodialysis stack 10 and 110, each constructed of alternating cation membranes and bipolar membranes, with the aqueous alkali metal chloride fed to the compartments between the positive side of each bipolar membrane and the adjacent cation membrane in the manner of streams 15a, 15b, 15c and 15d of FIG. 1. Dilute alkali metal hydroxide from vessel 20 is fed in streams 16 and 116 to the compartments of electrodialysis stacks 10 and 110 between the minus side of each bipolar membrane and the adjacent cation membrane in the manner of streams 16a, 16b and 16c of FIG. 1. Accordingly, the alkali metal chloride is acidified by removal of alkali metal cations and increase of protons, both in electrodialysis stack 10 and electrodialysis stack 110, and the acidified alkali metal chloride streams are removed and collected in streams 17 and 117, which are combined into stream 31.

The alkali metal hydroxide formed in each compartment of electrodialysis stack 10 and electrodialysis stack 110 between the minus side of a bipolar membrane and the adjacent cation membrane are all withdrawn and combined into streams 18 (from electrodialysis stack 10) and 118 (from electrodialysis stack 110). Both streams 18 and 118 are fed to vessel 20. Water is fed into vessel 20 through stream 21 so as to maintain the alkali metal hydroxide concentration in vessel 20 relatively constant. The portion of aqueous alkali metal hydroxide withdrawn from vessel 20 not fed in streams 16 and 116 is fed in stream 36 to electrolytic membrane cells 35a, 35b and 35c. Dilute aqueous alkali metal hydroxide stream 36 is split into three streams, each fed to a cathode compartment of an electrolytic membrane cell, illustrated by stream 36c fed to the cathode compartment of electrolytic cell 35c. Similarly, acidified alkali metal chloride stream 31 is split into three portions, streams 31a, 31b and 31c, which are fed, respectively, to the anode compartments of electrolytic membrane cells 35a, 35b and 35c.

In electrolytic membrane cell 35c, chlorine is generated from the acidified aqueous alkali metal chloride in the anode compartment, and hydrogen is generated from the dilute aqueous alkali metal hydroxide in the cathode compartment. Alkali metal cations migrate from the anode compartment to the cathode compartment such that the material remaining in the anode compartment is a depleted or more dilute alkali metal chloride solution which is withdrawn from each anode compartment and combined in stream 38, and optionally used to dissolve additional solid alkali metal chloride to regenerate the salt solutions used for streams 15 and 115. In each cathode compartment, alkali metal hydroxide streams of increased concentration are generated, and are removed and combined as product stream 37.

To a greater extent than in diaphragm cells, membrane cells have a tendency to have some leakage of hydroxide from the cathode compartments across the membranes to the anode compartments. If the aqueous alkali metal chloride fed to the anode compartments were not acidified, this hydroxide would cause the generation of hypochlorite or other by-product with the chlorine from the anode compartments. Since, however, the alkali metal chloride fed in stream 31 to the electrolytic membrane cells is acidified, any hydroxide migrating across the membranes in the electrolytic membrane cell would be neutralized before reaching the anode.

A preferred modification of the embodiment of FIG. 3 is to feed the salt solution as well as the base through dialysis stacks 10 and 110 in series. This would be accomplished by feeding incoming salt solutions in stream 15, and not stream 115, feeding acidified salt solution from stream 17 to stream 115 and feeding further acidified salt solution in stream 117 only to stream 31 and thence to the electrolytic cells. By matching the highest strength base and most acidified salt solution in electrodialysis stack 110, overall efficiencies are improved.

It should be appreciated that in both FIGS. 2 and 3, the alkali metal hydroxide generated in the electrodialysis of stacks 10 and 110 is in addition to alkali metal hydroxide generated in the electrolytic cells. In FIG. 2, the alkali metal hydroxide generated from the electrodialysis stacks is removed as a separate product stream 122. In the process of FIG. 3, this alkali metal hydroxide is fed in stream 36 to the electrolytic cells, and thus stream 37 contains both the alkali metal hydroxide formed from water splitting and that formed in the conventional electrolytic reaction.

EXAMPLE I

Figure 4:
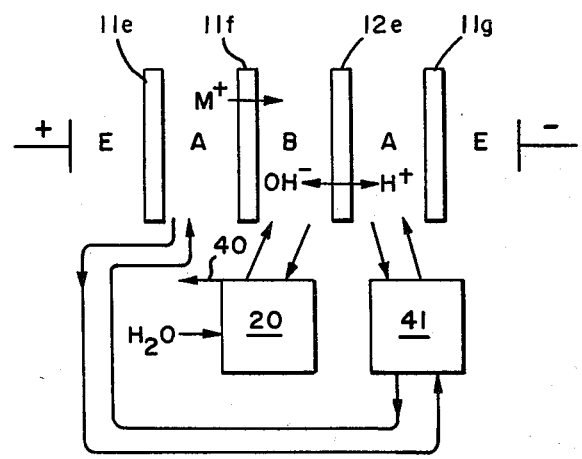

The cell shown in FIG. 4 was used to demonstrate the production of NaOH and acidified brine by electrodialytic water splitting. The membranes used were Dupont's Nafion ® 110 fluorocarbon membrane for membranes 11e, 11f and 11g and a bipolar membrane having an amine-crosslinked polystyrene-vinylbenzyl chloride anion layer prepared in accordance with U.S. Pat. 4,116,889 to Chlanda et al was used for membrane 12e. The E compartments were charged with 1 L of 0.5 M $Na_2SO_4$, the B reservoir with 31.5 mL of 8% NaOH and the A (brine) reservoir with 500 mL of 25% NaCl. The solutions were circulated through the cell compartments from the external reservoirs. The B reservoir was equipped with an overflow so that its volume remained constant; and as water and NaOH were transported to the B compartment, an overflow stream was obtained. To limit the concentration of NaOH formed in the B reservoir, water was added at a constant rate ($4 \times 10^{-3}$ mL/sec) to the B reservoir. Each membrane had an exposed area of 11 $cm^2$. A direct current of 1.2 amperes was passed. Small samples of the solution in the A reservoir were taken at intervals and analyzed for acidity by titration with NaOH. The overflow from the B reservoir was collected, weighed and analyzed for NaOH by titration with HCl. From the weight of solution collected in a time interval and the concentration change over that interval, the current efficiency was calculated by the formulas:

$$\Delta w = w_c f_c + 31.5(\rho_f f_f - \rho_o f_o)$$

$$\Delta w_t = (1.2 \Delta t / 96.5) \times 0.04$$

Current Efficiency = $\Delta w / \Delta w_t$

Where $\Delta w$ is the weight of the NaOH produced during the time interval, $w_c$ is the weight of solution collected from the B reservoir overflow and $f_c$ is the weight fraction of NaOH in the collected sample, 31.5 is the volume in mL of the B compartment, $\rho_f$ and $\rho_o$ are the densities of the base solution at the end and at the beginning of the interval respectively and $f_f$ and $f_o$ are the weight fractions of NaOH in the B compartment at the end and beginning of the interval, respectively. The theoretical weight of NaOH produced, $\Delta w_t$, is given by the product of current (1.2 A), the time interval in seconds, $\Delta t$, and the equivalent weight of NaOH divided by Faraday's constant.

The results of the experiment are shown in Tables Ia and Ib. The concentration of HCl in the A compartment (brine) reached 0.9%. A constant current efficiency for NaOH production of about 76% was observed, so that for these concentration ranges current efficiency is essentially independent of the acidity of the brine.

TABLE Ia

| Time Interval ($\times 10^{-3}$ sec) | Conc. NaOH Collected (%) | Wt. Collected (g) | Current Efficiency |
|---|---|---|---|
| 0–1.5 | 8.14 | 4.9298 | — |
| 1.5–3.0 | 8.56 | 5.0929 | .75 |
| 3.0–4.5 | 8.86 | 5.1117 | .76 |
| 4.5–6.0 | 9.16 | 5.1117 | .78 |
| 6.0–7.5 | 9.43 | 5.0385 | .75 |
| 7.5–9.0 | 9.63 | 5.1640 | .78 |
| 9.0–10.5 | 9.83 | 5.0623 | .73 |
| 10.5–12.0 | 9.93 | 5.2349 | .77 |
| 12.0–13.5 | 10.06 | 5.2608 | .75 |
| 13.5–15.0 | 10.13 | 5.1532 | .75 |
| 15.0–16.5 | 10.21 | 5.3078 | .74 |
| 16.5–18.0 | 10.24 | 5.3013 | .78 |
| 18.0–19.5 | 10.35 | 5.3886 | .78 |
| 19.5–21.0 | 10.30 | 5.3652 | — |

TABLE Ib

| Time ($\times 10^{-3}$ sec) | % HCl |
|---|---|
| 1.0 | .10 |
| 5.0 | .28 |
| 9.1 | .46 |
| 13.0 | .62 |
| 18.5 | .82 |
| 21.0 | .91 |

EXAMPLE II

Figure 5:
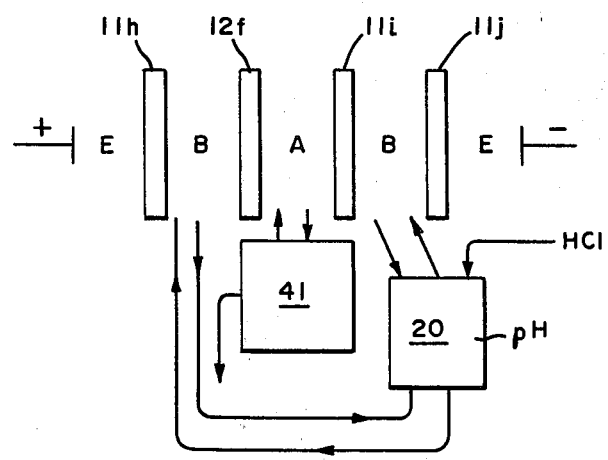

The effect of HCl concentration in the brine on current efficiency was determined in the cell shown schematically in FIG. 5. Membranes 11h and 11j were DuPont Nafion ® 110 fluoropolymer membranes. Membrane 12f was a bipolar membrane constructed in accordance with U.S. Pat. No. 4,116,889. Solutions were circulated through the cell from external reservoirs. The E compartments were charged with 1 L of 0.5 M Na$_2$SO$_4$, adjusted to pH 11 by adding a small amount of NaOH. The A reservoir was charged with 250 mL of 25% NaCl and the B reservoir was charged with 150 mL of 6% NaCl. Each membrane had an exposed area of 11 cm$^2$. The B reservoir was equipped with a pH probe. During the experiment a direct current of 1.2 amperes was passed. Small samples of the acid were withdrawn periodically and analyzed for acidity by titration with NaOH and for salt by evaporation to dryness. At intervals, measured amounts of standard 1 N HCl were added to the B reservoir (neutralizing the NaOH formed in the B cell) until pH 3 was reached. The pH of the B reservoir then rose due to the production of NaOH. The time at which pH 7 was reached was recorded. From the length of time between successive recorded times and the amount of HCl added to the B reservoir, the current efficiency for production of base could be determined by the formula:

$$\text{Current Efficiency} = \frac{96.5 \times \text{mL acid added} \times \text{normality of acid added}}{\text{current in amperes} \times \text{seconds between recorded times}}$$

In this way as the acidity in the acid (brine) increased, the efficiency for base generation could be determined. The current efficiency for base generation as a function of the molar ratio of HCl to NaCl in the acid (brine) are shown in Table IIa and IIb for two different cation membranes 11i, the perfluorosulfonic acid membrane manufactured by DuPont designated Nafion ® 110 and an experimental membrane made by sulfonation of a blend of polyvinyl chloride and crosslinked polystyrene, respectively.

TABLE IIa

| Time (sec) | Conc. HCl (mmoles/g) | Mole Ratio HCl:NaCl | Current Efficiency |
|---|---|---|---|
| 296 | .015 | .0035 | .961 |
| 780 | .031 | .0072 | .949 |
| 1219 | .046 | .0107 | .939 |
| 1678 | .062 | .0145 | .928 |
| 2056 | .075 | .0176 | .919 |
| 2461 | .089 | .0208 | .910 |
| 2948 | .105 | .0247 | .899 |
| 3437 | .122 | .0287 | .889 |
| 3901 | .138 | .0326 | .879 |
| 4434 | .156 | .0369 | .868 |
| 4961 | .174 | .0412 | .857 |
| 5456 | .191 | .0454 | .847 |
| 5999 | .209 | .0498 | .836 |
| 6556 | .228 | .0544 | .925 |
| 7110 | .247 | .0591 | .815 |
| 7631 | .265 | .0636 | .805 |
| 8146 | .283 | .0680 | .796 |

TABLE IIb

| Time (sec) | Conc. HCl (mmoles/g) | Mole Ratio HCl:NaCl | Current Efficiency |
|---|---|---|---|
| 240 | .0308 | .0070 | .903 |
| 718 | .0480 | .0109 | .869 |
| 1204 | .0652 | .0149 | .843 |
| 1696 | .0823 | .0189 | .813 |
| 2192 | .0992 | .0228 | .789 |
| 2694 | .1169 | .0268 | .766 |
| 3204 | .1326 | .0307 | .743 |
| 3730 | .1494 | .0347 | .719 |
| 4237 | .1652 | .0385 | .702 |
| 4708 | .1796 | .0419 | .683 |
| 5214 | .1947 | .0456 | .665 |
| 5728 | .2097 | .0493 | .647 |
| 6235 | .2241 | .0528 | .634 |
| 6737 | .2380 | .0563 | .618 |
| 7185 | .2502 | .0594 | .695 |

These tables show that the Nafion ® 110 membrane transports relatively less H+ than the experimental membrane. Cation membranes considered for use in acidification of brine can be tested in such a way or by other procedures well known in the art to determine their suitability for use in the acidification process.

EXAMPLE III

The same cell as used in Example I, except that the Nafion ® 110 membrane was replaced with a Nafion ® 324 membrane, was used to demonstrate the production of KOH and acidified KCl solution by electrodialytic water splitting. With reference to FIG. 4, the E chamber was charged with 1 L of 0.5 K$_2$SO$_4$, the B reservoir with 32 mL of 6% KOH and the A reservoir with 250 mL of 25% KCl solution. The solutions were circulated through the cell compartments from external reservoirs. The B reservoir was equipped with an overflow so that its volume remained constant; and as water and KOH were transported to the B reservoir, an overflow stream was obtained. Each membrane had an exposed area of 11 cm$^2$. A direct current of 1.8 amperes was passed. Small samples of the A reservoir (KCl stream) were taken at intervals and analyzed for acidity by titration with NaOH. The overflow from the B reservoir was collected, weighed and analyzed for KOH by titration with HCl. The change in KOH concentration in the B reservoir and HCl concentration in the A reservoir over the course of the experiment are shown in Tables IIIa and IIIb, respectively. The average current efficienty for KOH production was 0.83.

TABLE IIIa

| Time Interval ($\times 10^{-3}$ sec) | Wt. Base Collected | Conc. KOH Collected (%) |
|---|---|---|
| 0–1 | 0.7018 | 9.34 |
| 1–2 | 1.0052 | 11.72 |
| 2–3 | 1.0096 | 13.84 |
| 3–4 | 0.8340 | 15.87 |
| 4–5 | 0.8784 | 17.65 |
| 5–6 | 0.9003 | 19.31 |
| 6–7 | 0.8083 | 20.96 |
| 7–8 | 0.7690 | 22.18 |
| 8–9 | 0.7348 | 23.64 |

TABLE IIIb

| Time (sec) | % HCl |
|---|---|
| 0 | 0 |
| 2465 | 0.62 |
| 5060 | 1.10 |
| 8040 | 1.57 |
| 10115 | 1.80 |

EXAMPLE IV

The efficiency for generating KOH from KCl by electrodialytic water splitting as a function of KOH concentration was determined. The cell used was the same as in Example I and was charged with solutions as in Example III. The procedure was the same as in Example III except that acidity was not allowed to increase in the A reservoir (KCl stream). Instead, periodic additions of 10 mL of 0.982 M KOH and solid KCl (to keep the KCl concentration in the acid at about 25%) were made. The pH was monitored and the time for each aliquot of KOH to be neutralized was recorded. The current efficiency was calculated by the formula:

$$\text{Current efficiency} = \frac{96.5 \times \text{mL base added} \times \text{normality of base added}}{\text{current in amperes} \times \text{seconds to neutralize base added}}$$

The base concentration was monitored by collecting the overflow from the base during the time interval, weighing the sample and titrating with standard HCl. The results are as follows:

| Time Interval | Conc. KOH (%) | Current Efficiency |
|---|---|---|
| 0–799 sec. | 9.85 | 0.659 |
| 799–1629 | 11.25 | 0.634 |
| 1794–2669 | 12.78 | 0.602 |
| 2669–3580 | 14.04 | 0.578 |
| 3580–4542 | 15.30 | 0.547 |
| 4542–5531 | 16.32 | 0.532 |

EXAMPLE V

The procedure of example IV was repeated but a Nafion ® 324 membrane was used in place of a Nafion ® 110 membrane. The results were as follows:

| Time Interval | Conc. KOH (%) | Current Efficiency |
|---|---|---|
| 0–555 sec. | 8.11 | 0.946 |
| 555–1110 | 9.58 | 0.946 |
| 1232–1791 | 11.15 | 0.939 |
| 1791–2352 | 12.51 | 0.936 |
| 2470–3033 | 14.03 | 0.932 |
| 3033–3594 | 15.29 | 0.936 |

As a result of the using the Nafion ® 324 membrane in place of the Nafion ® 110 membrane, the current efficiency is greatly improved.

What is claimed is:
1. A process which comprises the steps:
   (a) introducing aqueous alkali metal chloride solution into each first compartment between a cation membrane and a cation side of a bipolar membrane of an electrodialytic water splitter comprised of alternating cation and bipolar membranes, said membranes being positioned between an anode and a cathode,
   (b) introducing into each second compartment between a cation membrane and an anion side of a bipolar membrane a liquid comprising water,
   (c) passing a direct current through said water splitter thereby causing acidification of said aqueous alkali metal chloride solution and basification of said liquid comprising water and transfer of alkali metal cations from said aqueous salt solution to said liquid comprising water,
   (d) withdrawing from said second compartments a liquid comprising aqueous alkali metal hydroxide,
   (e) withdrawing from said first compartments an acidified aqueous salt solution comprising between about 0.6 and 13 moles HCl per 100 hundred moles alkali metal chloride, and
   (f) feeding said acidified salt solution to the anode compartment of a diaphragm or membrane electrolytic cell.
2. The process of claim 1 wherein said alkali metal chloride is sodium chloride.
3. The process of claim 2 wherein said aqueous sodium chloride solution is an essentially saturated solution.
4. The process of claim 1 wherein said alkali metal chloride is potassium chloride.
5. The method of claim 1 or 2 or 3 or 4 wherein the residence time of said aqueous alkali metal chloride solution in said first compartments is sufficient to cause said acidified aqueous salt solution to have a concentration between about 1 and about 10 moles HCl per one hundred moles alkali metal chloride.
6. The process of claim 5 wherein the liquid comprising aqueous alkali metal hydroxide withdrawn from said second compartments has a concentration between about 5 and about 40 weight percent alkali metal hydroxide.
7. The process of claim 5 wherein said acidified salt solution is fed to the anode compartment of a diaphragm electrolytic cell, and the residence time of aqueous alkali metal chloride solution in said first compartments is sufficient to cause said acidified salt solutions to have between about 0.17 and about 0.7 weight percent HCl.
8. The process of claim 5 wherein said acidified salt solution is fed to the anode compartment of a membrane electrolytic cell and the residence time of aqueous alkali metal chloride solution in said first compartments is sufficient to cause said acidified salt solution to have between about 0.7 and about 1.5 weight percent HCl.

9. A process of forming an acidified aqueous salt solution comprising the steps:
   (a) introducing aqueous alkali metal chloride solution into each first compartments between a cation membrane and a cation side of a bipolar membrane of an electrodialytic water splitter comprised of alternating cation and bipolar membranes, said membranes being positioned between an anode and a cathode,
   (b) introducing into each second compartment between a cation membrane and an anion side of a bipolar membrane a liquid comprising water,
   (c) passing a direct current through said water splitter thereby causing an acidification of said aqueous alkali metal chloride solution and transfer of alkali metal cations from said aqueous salt solution to said liquid comprising water,
   (d) withdrawing from said second compartments a liquid comprising aqueous alkali metal hydroxide, and
   (e) withdrawing from said first compartments an acidified aqueous salt solution comprising between about 0.1 and 2 weight % HCl.

10. The process of claim 9 wherein said alkali metal chloride is sodium chloride.

11. The process of claim 10 wherein said aqueous sodium chloride solution is an essentially saturated solution.

12. The process of claim 9 wherein said alkali metal chloride is potassium chloride.

13. The method of claim 9 or 10 or 11 or 12 wherein the residence time of said aqueous alkali metal chloride solution in said first compartments is sufficient to cause said acidified aqueous salt solution to have a concentration between about 0.17 and about 1.5 weight HCl.

14. The process of claim 13 wherein the liquid comprising aqueous alkali metal hydroxide withdrawn from said second compartments has a concentration between about 5 and about 40 weight percent alkali metal hydroxide.

15. The method of claim 1 or 9 wherein at least two two-compartment water splitters are employed and wherein the liquid comprising aqueous alkali metal hydroxide withdrawn from the second compartments of a first two-compartment water splitter is the liquid comprising water fed to the second compartments of a second two-compartment water splitter.

16. The method of claim 15 wherein the acidified aqueous salt solution withdrawn from the first compartments of the first two compartment water splitter is the aqueous alkali metal chloride solution fed to the first compartments of the second two-compartment water splitter.

* * * * *